(12) United States Patent
Riedel

(10) Patent No.: US 6,732,241 B2
(45) Date of Patent: May 4, 2004

(54) TECHNIQUE FOR MIGRATING DATA BETWEEN STORAGE DEVICES FOR REDUCED POWER CONSUMPTION

(75) Inventor: Erik Riedel, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 09/948,362

(22) Filed: Sep. 7, 2001

(65) Prior Publication Data

US 2003/0051104 A1 Mar. 13, 2003

(51) Int. Cl.⁷ .............................................. G06F 12/00
(52) U.S. Cl. ..................... 711/154; 711/100; 711/167
(58) Field of Search ................................. 711/154, 100, 711/167; 365/227

(56) References Cited

U.S. PATENT DOCUMENTS

| | | | | |
|---|---|---|---|---|
| 5,155,835 A | * | 10/1992 | Belsan | 711/114 |
| 5,403,639 A | * | 4/1995 | Belsan et al. | 707/204 |
| 5,481,733 A | * | 1/1996 | Douglis et al. | 713/324 |
| 5,706,467 A | * | 1/1998 | Vishlitzky et al. | 711/129 |
| 6,032,224 A | * | 2/2000 | Blumenau | 711/117 |
| 6,434,682 B1 | * | 8/2002 | Ashton et al. | 711/162 |

OTHER PUBLICATIONS

Lu et al., "Low–Power Task Scheduling for Multiple Devices," pp 1–5, ACM, May 2000.*

Liu, "A Cost–Effective Desktop Computer Power Management Architecture for the Energy Star Computer Program," pp 1337–1341, IEEE.*

Douglis, Fred; Caceres, Ramon; Kaashoek, Frans; Li, Kai; Marsh, Brian; Tauber, Joshua A. "Storage Alternative For Mobile Computers", Proc. 1994 Symposium on Operating Systems Design and Implementation, OSDI, Nov. 1994.

Ellis, Carla; Fan, Xiaobo; Lebeck Alvin R.; Zeng, Heng. "Power Aware Page Allocation" Appears in the Proceedings of the Ninth International Conference on Archtectural Support for Programming Languages and Operating Systems (ASPLOS–IX), Nov. 2000.

Bershad, Brian; Douglis, Fred; Krishnan, P. "Adaptive Disk Spin–down Polices For Moblie Computers" Appears in the Second USENIX Symposium on Mobile and Location-IndependentComputing. Ann Arbor, MI, pp. 121–137, Apr. 1995.

Flinn, Jason and Satyanarayanan, M. "Energy–aware Adaptation for Mobile Applications", Dec. 1999.

* cited by examiner

*Primary Examiner*—Matthew Kim
*Assistant Examiner*—Stephen Elmore

(57) ABSTRACT

A method of and apparatus for migrating data between storage devices for reducing power consumption. Unlike prior techniques for conserving power by spinning down a magnetic disk (e.g., in a laptop computer), the present invention migrates data based on the assumption that the disk is maintained spinning (e.g., in a server). Accordingly, the incremental power consumed by maintaining data on the disk is nominal in comparison to the amount of power required to store the data in volatile memory (e.g., RAM). Data placement is largely based on the goal of minimizing power consumption during periods when the data is not being accessed. Further, unlike conventional techniques in which data is removed from RAM only when a better candidate is available to replace the data, the present invention may move data from RAM regardless of whether replacement data is available. This is avoids consumption of power to maintain data in RAM that is idle. Thus, under certain conditions, the inventive technique for data migration in a computer system reduces power consumption in comparison to conventional algorithms.

34 Claims, 3 Drawing Sheets

TECHNIQUE FOR MIGRATING DATA BETWEEN STORAGE DEVICES FOR REDUCED POWER CONSUMPTION

FIELD OF THE INVENTION

The present invention relates to the field of data storage for computer systems. More particularly, the present invention relates to the field of migrating data between storage devices in a computer system so as to conserve resources, such as power.

BACKGROUND OF THE INVENTION

Computer systems typically include both random access memory (RAM) and magnetic disk memory. Each of these memory devices has its advantages and disadvantages. For example, RAM is generally more expensive than disk memory, but also has lower read and write latencies.

Conventional methods for moving data between RAM and disk memory devices in a computer system take into account some these relative strengths. More particularly, a conventional method moves blocks of data between RAM and disk memory based solely on a single parameter, a re-use "value," for each block of data. Typically, the reuse value for a particular block of data is computed based on historical use of the block; those blocks that require more frequent access have higher reuse values. The reuse value for each block is compared to that of other data blocks. Those blocks that require more frequent access are placed in RAM while the remaining blocks are stored in disk memory. When the reuse value for a block in disk memory exceeds that of a block in RAM, the block from disk memory replaces the block in RAM. This method, however, does not take power consumption into consideration. Nor does this technique take into account the amount of time an unused block remains in RAM; rather, unused blocks remain in RAM based solely on how quickly an alternative block is available to replace it.

For battery-powered systems, such as laptop computers, it is generally desired to minimize power consumption so as to maximize usage between battery recharges. A feature of magnetic disk storage that is conventionally exploited in battery-powered systems is placement of the disk into standby mode to reduce power consumption. Typically, a disk in standby mode is "spun-down" to conserve power which would otherwise be used to keep the disk spinning. When the disk needs to be read from or written to, it is necessary to then "spin-up" the disk. In order to amortize the amount of power required to spin-up the disk, the disk must have been maintained in the standby mode for at least a certain amount of time. In their paper entitled, "Adaptive Disk Spin-down Policies for Mobile Computers," Second USENIX Symposium on Mobile and Location-Independent Computing, Ann Arbor, Mich. pp. 121–137 (April 1995), F. Douglis, P. Krishnan and B. Bershad describe a system in which algorithms attempt to maintain the disk in standby mode as much as possible while minimizing the frequency of spinning up the disk. This power-saving technique is limited, however, by the ability to amortize the power required to spin-up the disk.

In their paper entitled, "Energy-aware adaptation for mobile applications," ACM 1-58113-140-2/99/0012 (1999), J. Flinn and M. Satyanarayanan, discuss the use of application software that can dynamically modify its behavior to conserve energy in a mobile computer. This technique has a drawback in that power savings are generally achieved at the cost of fidelity, such as in display of graphics.

Another technique for conserving power in mobile computers involves the use of power management features of certain DRAM devices. In their paper entitled, "Power Aware Page Allocation," Proceedings of the Ninth International Conference in Architectural Support for Programming Languages and Operating Systems (November 2000), A. Lebeck, X. Fan, H. Zeng and C. Ellis consider page allocation policies to complement the ability of the memory devices to adjust power modes. This technique has a drawback in that it requires specially-designed DRAM devices.

Yet another paper, "Storage Alternatives for Mobile Computers," F. Douglis, R. Cáceres, F. Kaashoek, K. Li, B. Marsh and J. Tauber, Proceedings of the $1^{st}$ USENIX Symposium on Operating Systems Design and Implementation, (OSDI '94) Monterey, Calif., pages 25–37 (November 1994), discusses data storage for mobile computers. The authors investigate use of magnetic hard disks, flash memory disk emulators and flash memory cards for mobile computers. Flash memory is considered for replacing or augmenting disk memory, but no policies are suggested that would conserve power during periods in which data is idle.

Therefore, what is needed is a technique for migrating data between storage devices that does not suffer from the aforementioned drawbacks. More particularly, what is needed is such a technique in which power consumption is minimized. It is to these ends that the present invention is directed.

SUMMARY OF THE INVENTION

The invention is a technique for migrating data between storage devices for reducing power consumption. Unlike prior techniques for conserving power by spinning down a magnetic disk, the present invention migrates data based on the assumption that the disk is maintained spinning (e.g., in a server). Accordingly, the incremental power consumed by maintaining data on the disk is nominal in comparison to the amount of power required to store the data in volatile memory (e.g., RAM). Data placement is largely based on the goal of minimizing power consumption during periods when the data is not being accessed. Further, unlike conventional techniques in which data is removed from RAM only when a better candidate is available to replace the data, the present invention may move data from RAM regardless of whether replacement data is available. This is avoids consumption of power to maintain data in RAM that is idle. Thus, under certain conditions, the inventive technique for data migration in a computer system reduces power consumption in comparison to conventional algorithms.

In accordance with an aspect of the invention, data is migrated between storage devices in a computer system having a first memory device and a second memory device. The first memory device may require more power to maintain a data block valid than the second memory device. The data block is moved from the first memory device to the second memory device when an anticipated amount of time before a next access to the data block exceeds a predetermined threshold.

The data may be moved from the first memory device regardless of whether a replacement data block is available. The first memory device may include random access memory (RAM) while the second memory device may include a magnetic disk or flash memory. The magnetic disk may be maintained in its spinning condition. The first memory device may require repeated refreshing while the second memory device may not.

In accordance with another aspect of the invention, the first memory device, the second memory device and a third memory device are included in the computer system. A data block is moved from the first memory device to the second memory device in response to an anticipated time until a next access to the data block for reading or writing. Alternately, the data block is moved from the first memory device to the third memory device in response to an anticipated time until a next read access to the data block being different from an anticipated time until a next write access to the data block.

More particularly, the data block may be moved from the first memory device to the second memory device when the anticipated amount of time before a next read access to the data block exceeds a first predetermined threshold and an anticipated amount of time before the next write access to the data block exceeds a second predetermined threshold. Further, the data block may be moved from the first memory device to the third memory device when the anticipated amount of time before the next read access to the data block does not exceed the first predetermined threshold and the anticipated amount of time before the next write operation exceeds the second predetermined threshold.

The third memory device may include flash memory. Thus, the third memory device may have a write latency that is significantly higher than its read latency.

In accordance with yet another aspect of the invention, a data block is assigned to the first memory device of the computer system. An anticipated amount of time before a next write access to the data block is computed. The data block is removed from the first memory device when the anticipated amount of time until the next write access to the data block exceeds a first threshold. An anticipated amount of time before a next read access to the data block is computed. The data block is inserted into the second memory device when the anticipated time until the next read access to the data block exceeds a second threshold. Otherwise, the data block is inserted into the third memory device.

DETAILED DESCRIPTION OF A PREFERRED EMBODIMENT

Figure 1:
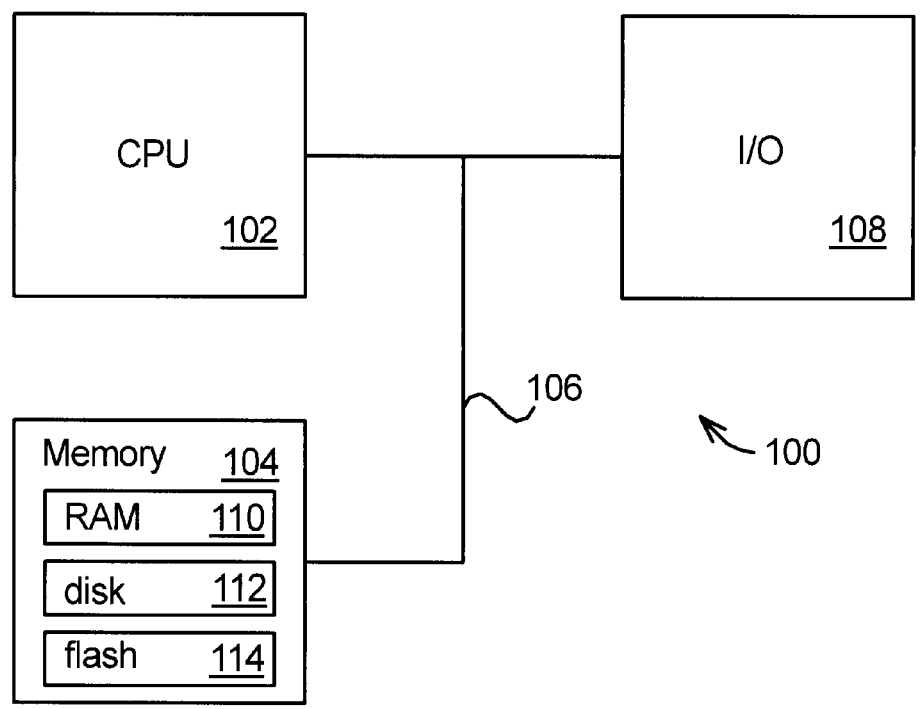
FIG. 1 illustrates a block schematic diagram of a general-purpose computer system 100 by which the present invention may be implemented.

FIG. 1 illustrates a block schematic diagram of a general-purpose computer system 100 by which the present invention may be implemented. The computer system 100 may include a general-purpose processor 102, memory 104, a communication bus 106, and input/output devices 108, such as a keyboard, monitor, mouse and network interface. The memory 104 may include various different memory devices. In one embodiment, the memory 104 includes volatile (i.e. transitory) memory 110, such as random-access memory (RAM). The RAM memory 110 may be DRAM (dynamic RAM), which requires repeated refreshing to maintain data, or SRAM (static RAM), which generally requires constant current flow to maintain data. The memory 104 may also include magnetic memory 112, such as a magnetic hard disk or hard drive. In another embodiment, the memory 104 includes another type of memory device 114, such as a solid-state, non-volatile (i.e. non-transitory) memory. For example, the memory device 114 may include flash memory, electrically-erasable, programmable read-only memory (EEPROM), magneto-resistive read-only memory (MRAM) or micro-electromechanical system-based memory (MEMS-based memory).

It will be apparent that the computer system 100 may include more or fewer elements than are shown in FIG. 1 and that other elements may be substituted for those illustrated in FIG. 1. Software for implementing the present invention, such as for migrating data between memory devices in accordance with the present invention, may be stored in the memory 104 in accordance with the present invention.

In one embodiment, the computer system 100 functions as a network file server or database system. Accordingly, the system 100 may provide access to a significant quantity of data stored in the memory 104. A number of networked workstations may, for example, access the data via the system 100. Thus, various portions or blocks of data stored by the system 100 will generally be subjected to various different sequences of read and write operations. For example, some of the data, such as working files, may be read from and written to frequently. Other blocks the data, such as directories or world wide web content files, may be read often, but seldom written to. Still other blocks of data, such as back-up copies of current work in-progress, may be frequently written to, but seldom read from. Still further blocks of data, such as archival copies of completed data files, may be seldom accessed for reading or writing. In other embodiments, depending upon memory usage patterns, advantages of the present invention may be obtained where the computer system 100 functions as a personal computer (PC) or workstation which may be networked or stand-alone.

In accordance with the present invention, the magnetic disk memory 112 is generally maintained in its active or spinning condition. This is because accesses to the data on the disk 112 may be expected to occur with sufficient frequency that the power required to spin up the disk 112 cannot generally be amortized by spinning down the disk 112 during idle periods. Accordingly, unlike conventional systems in which a disk is spun-down during idle periods to conserve power, an aspect of the present invention is directed to a system in which the magnetic disk memory 112 is maintained in its active or spinning condition for extended periods. Data migration techniques that take into account that the disk 112 is maintained spinning are then employed to minimize the amount of power consumed by the system. Note that the disk 112 may also be spun down when it is expected to be idle for an extended period (e.g., a longer period than is conventionally required to spin down the disk).

That the disk 112 is maintained spinning provides that little or no additional power is required to maintain storage of additional blocks of data on the disk 112 (i.e. the incremental power consumed for each additional block of data maintained on the disk 112 is negligible). In contrast, storing data in volatile memory, such as RAM, consumes power even if the data is not being accessed. This is because a constant current flow is required to maintain the data or the data must be repeatedly refreshed. Thus, power consumption can be minimized to the extent that data can be moved from RAM to disk. This is because by minimizing the amount of data in RAM, the system 100 may be constructed with less volatile memory 110 capacity than would otherwise be required. Alternately, a volatile memory device 110 that has a low-power or standby mode may be utilized in the system 100. In which case, portions of the RAM memory may be put into a "sleep" mode during periods of low activity. In either case, power consumption by the system 100 may be minimized by minimizing the amount of data stored in volatile memory 110. This is in contrast to conventional systems in which duplicate copies of data are unnecessarily stored in RAM as well as on a magnetic disk. For example, one of the primary uses of RAM in servers is a file buffer cache, which caches (i.e. duplicates) blocks already stored on disk. The size of the file buffer cache may be between 20% and 80% of the RAM in a server, depending upon the expected workload. Accordingly, use of the present invention in such a server may potentially conserve a significant amount of power.

Figure 2:
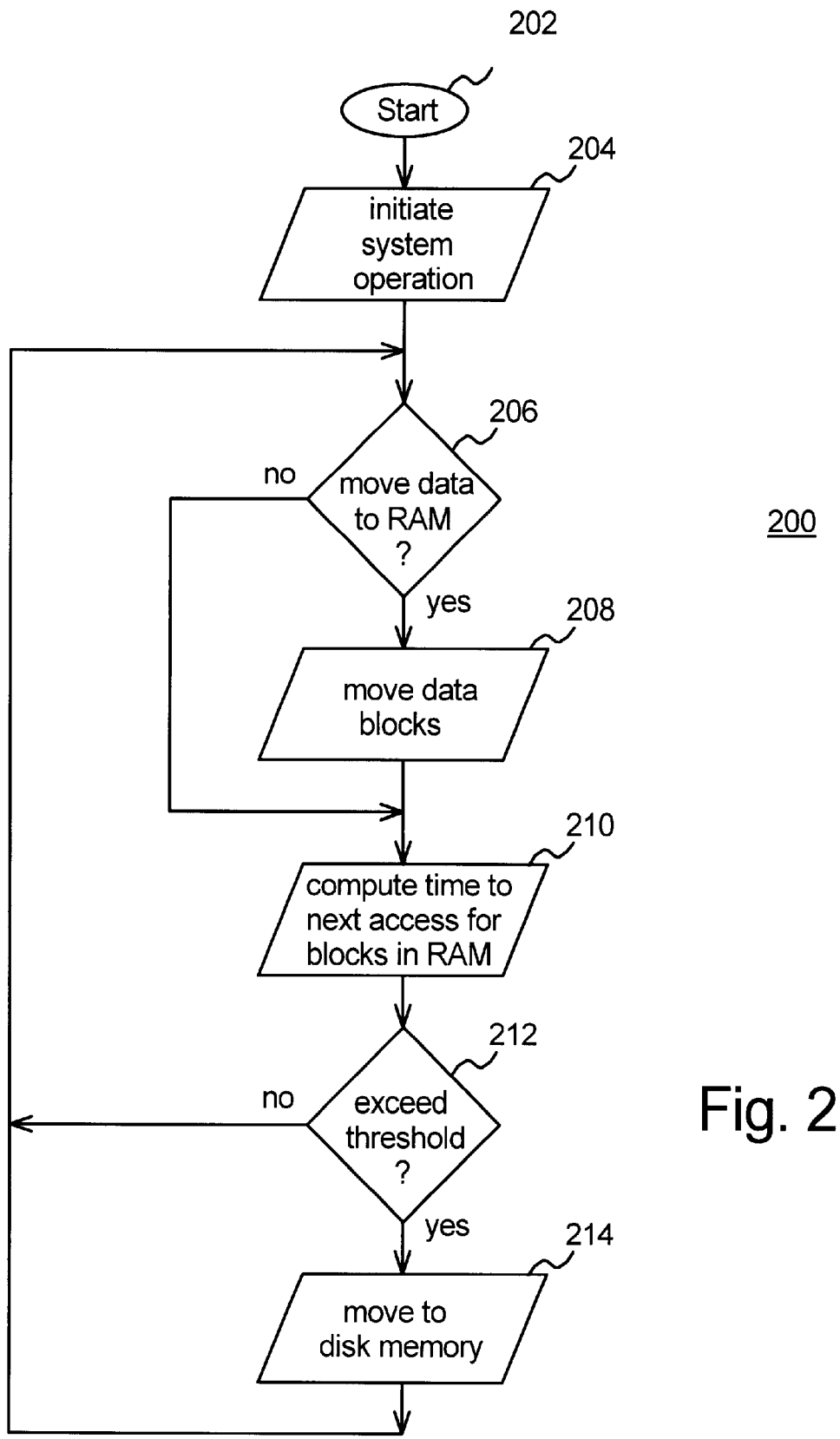
FIG. 2 illustrates a flow diagram of a process for migrating data between memory devices in accordance with the present invention.

FIG. 2 illustrates a flow diagram 200 of a process for migrating data between memory devices in accordance with the present invention. As mentioned, a software program which implements the process of FIG. 2 may be stored in the memory 104 of the computer system 100 of FIG. 1 for causing the processor 102 to perform the steps of the process.

Referring to FIG. 2, program flow begins in a start state 202. From the state 202, program flow moves to a state 204. In the state 204, an application program and/or operating system software may be initiated to run on the system 100 (FIG. 1). For example, assuming the system 100 is to function as a database server, a database application may be employed in the state 204. As another example, assuming the system 100 is to function as a file server, a server-side application may be employed. During operation, read and/or write operations may be performed on the data stored by the system 100.

From the state 204, program flow moves to a state 206 in which a determination may be made as to whether data should be moved into volatile memory 110 (e.g., RAM), such as from the disk memory 112. For example, during operations performed by the program initiated in state 204, a request may be made to read from or write to a particular block of data stored on the disk 112. In response, the affected block of data may be moved from the disk 112 to the memory device 110. It will be apparent that other techniques may be used to determine whether to move data into memory 110.

Assuming data is to be moved, program flow moves to a state 208 in which the move may be performed. From the state 208, program flow moves to a state 210. Alternately, assuming it is determined in the state 206 that data need not be moved, then program flow may move directly from the state 206 to the state 210. For example, data needing to be read from or written to may already be present in the memory device 110.

In the state 210, for each of the data blocks in the volatile memory 210, the system 100 may compute an expected amount time until a next access for reading from or writing the data block. For example, this time period may be estimated based on historical accesses to the data blocks or on other knowledge of expected activity or workload.

From the state 210, program flow moves to a state 212 in which the time period computed in the state 208 for each block may be compared to a predetermined threshold. Assuming that the computed time period for a particular data block exceeds the threshold, this indicates that the block is not expected to be accessed soon and that power may be conserved by moving the block to a memory device that will consumes less power to maintain the block, such as the disk 112 or a flash memory device. In which case, program flow moves to a state 214 in which the data block may be moved from the volatile memory device 110 to the disk memory device 112. From the state 214, program flow may return to the state 206 where the process described above may be repeated.

Alternately, if the computed time period for the block does not exceed the threshold, this indicates that the block is expected to be accessed soon and that it would be preferable to maintain the block in volatile memory 110 at least until it is next accessed. In which case, program flow may skip the state 214.

Accordingly, a technique has been described for migrating data between volatile and non-volatile memory devices in order to minimize power consumed, such as to refresh the volatile memory device. In contrast to conventional computer systems in which data is moved out of volatile memory only when data with a high reuse value is available to replace it, in accordance with the present invention, data is moved out of volatile memory based on its anticipated use and regardless of whether replacement data is available.

Adjusting the level of the threshold used for the determination made in the state 212 will generally result in a trade-off between power conservation and performance. More particularly, increasing the threshold will result in more data blocks being maintained in volatile memory 110. This will tend to increase performance since the read and write latencies for volatile memory devices (e.g., RAM) tend to be lower than for other memory types, such as magnetic disk memory. However, increasing the threshold will also tend to use more power which is required to maintain the data valid in volatile memory.

Conversely, reducing the threshold will tend to reduce power consumption since less volatile memory will need power to maintain its data valid. However, performance will tend to suffer when data stored on the disk 112 is accessed since disk memory tends to have longer read and write latencies than RAM. Under certain circumstances, it may be desirable to adjust the threshold dynamically, such as in response to a sensed parameter.

Note that the program initiated in the state 204 may continue to operate while data is migrated between storage devices in accordance with the present invention. For example, the steps of moving data from the disk memory 112 to the volatile memory device 110, computing times to the next access for each data block in the memory device 110, comparing the computed times to the predetermined threshold and moving those blocks whose computed times exceed the predetermined threshold back to the disk memory 112, may be performed continuously and repeatedly during operation of the system 100.

Figure 3:
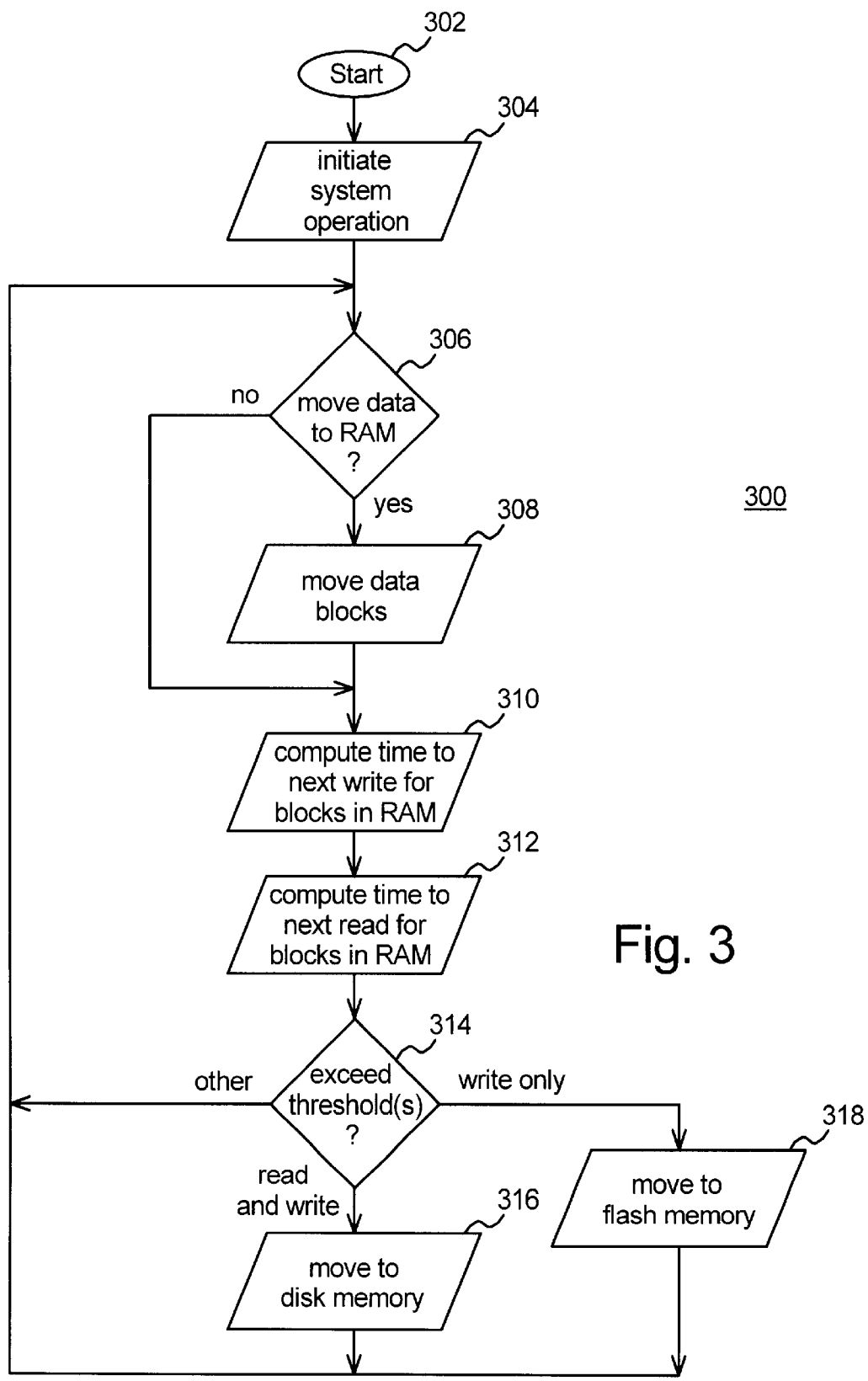
FIG. 3 illustrates a flow diagram of an alternate process for migrating data between memory devices in accordance with the present invention.

FIG. 3 illustrates a flow diagram 300 of an alternate process for migrating data between memory devices in accordance with the present invention. The process of FIG. 3 differs from that of FIG. 2 in that data may also be moved into (and out of) the memory device 114 (FIG. 1), as well as devices 110 and 112. For example, the memory device 114 may include flash memory or a similar type of memory whose characteristics differ from that of RAM or disk memory. For example, for flash memory, read latency generally differs from write latency and the power consumed during reading generally differs from the power consumed during writing. Thus, under certain circumstances, it may be beneficial to move data from the volatile memory 112 into the flash memory 114 in order to conserve power. More particularly, when certain data blocks are expected to be read frequently, but seldom written to, then storing the data in flash memory 114 may reduce power consumption.

Table 1 below illustrates exemplary values for cost, read and write latency and power consumed per megabyte of data stored by RAM, disk and flash memory types. The precise values will vary; however, the table is useful for comparison purposes. As can be seen from Table 1, the write latency for flash memory is significantly higher than the read latency for flash, which is comparable to that of RAM.

TABLE 1

|  | Cost ($/MB) | Speed (Read) | Speed (Write) | Power (mW/MB) |
|---|---|---|---|---|
| RAM | $0.86 | 0.13 ms | 0.13 ms | 1.96 mW |
| Disk | $0.02 | 5.00 ms | 6.00 ms | 0.41 mW |
| Flash | $1.56 | 0.15 ms | 2.00 ms | 0.05 mW |

Further, writing to flash memory generally requires significant energy since the physical properties of memory cells are typically altered in order to perform the write operation. Table 2 shows exemplary energy consumption values for reading from and writing to RAM, disk and flash memory (the values given are per kilobyte of data).

TABLE 2

|  | Energy (Read) | Energy (Write) |
|---|---|---|
| RAM | 0.02 mJ | 0.02 mJ (milli-Joules) |
| Disk | 14.5 mJ | 17.4 mJ |
| Flash | 0.01 mJ | 0.48 mJ |

Thus, to conserve power, a policy may be adopted in which data blocks that will soon be accessed for reading and writing are maintained in the volatile memory 110, while data blocks that will soon be accessed for reading, but not writing, are maintained in flash memory 114. Data that is infrequently accessed for reading or writing may be maintained in disk memory 112. Table 3 below illustrates this policy:

TABLE 3

| Read Frequency | Write Frequency | Memory Type | Example |
|---|---|---|---|
| high | high | RAM | working set |
| low | low | Disk | archival |
| high | low | Flash | web content |

Thus, referring to FIG. 3, program flow begins in a start state 302. From the state 302, program flow moves to a state 304. In the state 304, an application program and/or operating system software may be initiated to run on the system 100 (FIG. 1), as described above in reference to the state 204 of FIG. 2.

From the state 304, program flow moves to a state 306 in which a determination may be made as to whether data should be moved from disk memory 112 (or flash memory 114) into volatile memory 110 (e.g., RAM). For example, during operations performed by the program initiated in state 304, a request may be made to read from or write to a particular block of data stored on the disk 112. In response, the affected block of data may be moved from the disk 112 to the memory device 110. It will be apparent that other techniques may be used to determine whether to move data into memory 110.

Assuming data is to be moved, program flow moves from the state 306 to a state 308 in which the move may be performed. From the state 308, program flow moves to a state 310. Alternately, assuming it is determined in the state 306 that data need not be moved, then program flow may move directly from the state 306 to the state 310.

In the state 310, for each of the data blocks in the volatile memory 110, the system 100 may compute an expected amount time until a next access for writing the data block. For example, this time period may be estimated based on historical write operations to each data block or on other knowledge of expected activity or workload.

Program flow may then move from the state 310 to a state 312 in which the system 100 may compute an expected amount of time until a next access for reading from each of the data blocks in the volatile memory 110. Accordingly, rather than computing single expected amount of time until a next a read or write access, as in state 210 of FIG. 2, a separate time periods may be computed for both a next read operation and for a next write operation.

From the state 312, program flow moves to a state 314 in which the time periods computed in the states 310 and 312 may be compared to predetermined thresholds for each. Thus, for each block of data in the volatile memory 110, an anticipated time period until a next read operation may be compared to predetermined "read" threshold. Similarly, an anticipated time period until a next write operation may be compared to a predetermined "write" threshold.

Assuming that the computed time period for reading from a particular data block exceeds the corresponding "read" threshold and the computed time period for writing to the data block exceeds the corresponding "write" threshold, this indicates that the block is not expected to be accessed soon. Accordingly, power may be conserved by moving the block to the disk 112. In which case, program flow moves to a state 314 in which the data block may be moved from the volatile memory device 110 to the disk memory device 112. From the state 314, program flow may return to the state 306 where the process described above may be repeated.

Alternately, if the computed time period for reading from the block does not exceed the "read" threshold, but the computed time period for writing the block does exceed the "write" threshold, this indicates that the block is expected to be accessed for reading soon, but not for writing. Accordingly, power may be conserved by moving the block to the flash memory device 114. In which case, program flow moves to a state 318 in which the data block may be moved from the volatile memory device 110 to the flash memory device 114. From the state 318, program flow may return to the state 306 where the process described above may be repeated.

And, if the computed time period if the computed time period for writing the block does not exceed the threshold, this indicates that the block is expected to be accessed for writing soon. In which case, it would generally be preferable to maintain the block in volatile memory 110 at least until it is next accessed. In which case, program flow may skip the states 316 and 318 and, instead return to the state 306 where the process described above may be repeated.

Accordingly, a technique has been described for migrating data between volatile, non-volatile (e.g., flash memory) and disk memory devices in order to minimize power consumption.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. An apparatus for migrating data between storage devices in a computer system having a first memory device and a second memory device, the first memory device requiring more power to maintain a data block valid than the second memory device, wherein the data block is moved from the first memory device to the second memory device when an anticipated amount of time before a next access to the data block exceeds a predetermined threshold.

2. The apparatus according to claim 1, wherein the data block is moved from the first memory device to the second memory device regardless of whether a replacement data block is available.

3. The apparatus according to claim 1, wherein the first memory device includes random access memory (RAM).

4. The apparatus according to claim 3, wherein the second memory device includes a magnetic disk.

5. The apparatus according to claim 3, wherein the magnetic disk is maintained in its spinning condition.

6. The apparatus according to claim 3, wherein the second memory device includes flash memory.

7. The apparatus according to claim 1, wherein the first memory device requires repeated refreshing.

8. The apparatus according to claim 7, wherein the second memory device does not require refreshing.

9. A method of migrating data between storage devices in a computer system, comprising steps of:
   a. assigning a data block to a first memory device of the computer system;
   b. computing an anticipated amount of time before a next access to the data block; and
   c. moving the data block from the first memory device to a second memory device of the computer system when the anticipated amount of time before a next access to the data block exceeds a predetermined threshold.

10. The method according to claim 9, wherein the first memory device requires more power to maintain the data block than the second memory device.

11. The method according to claim 9, wherein the data block is moved from the first memory device to the second memory device regardless of whether a replacement data block is available.

12. The method according to claim 9, wherein the first memory device includes random access memory (RAM).

13. The method according to claim 12, wherein the second memory device includes a magnetic disk.

14. The method according to claim 13, wherein the magnetic disk is maintained in its spinning condition.

15. The method according to claim 13, wherein the second memory device includes flash memory.

16. The method according to claim 9, wherein the first memory device requires repeated refreshing.

17. The method according to claim 16, wherein the second memory device does not require refreshing.

18. An apparatus for migrating data between storage devices in a computer system having a first memory device, a second memory device and a third memory device, wherein a data block is moved from the first memory device to the second memory device in response to an anticipated time until a next access to the data block for reading or writing and wherein the data block is moved from the first memory device to the third memory device in response to an anticipated time until a next read access to the data block being different from an anticipated time until a next write access to the data block.

19. The apparatus according to claim 18, wherein the data block is moved from the first memory device to the second memory device when the anticipated amount of time before a next read access to the data block exceeds a first predetermined threshold and an anticipated amount of time before the next write access to the data block exceeds a second predetermined threshold and wherein the data block is moved from the first memory device to the third memory device when the anticipated amount of time before the next read access to the data block does not exceed the first predetermined threshold and the anticipated amount of time before the next write operation exceeds the second predetermined threshold.

20. The apparatus according to claim 18, wherein the data block is moved from the first memory device to the second or third memory device regardless of whether a replacement data block is available.

21. The apparatus according to claim 18, wherein the first memory device includes random access memory (RAM).

22. The apparatus according to claim 21, wherein the second memory device includes a magnetic disk.

23. The apparatus according to claim 22, wherein the magnetic disk is maintained in its spinning condition.

24. The apparatus according to claim 22, wherein the third memory device includes flash memory.

25. The apparatus according to claim 18, wherein the first memory device requires more power to maintain the data block valid than the second memory device.

26. The apparatus according to claim 18, wherein the first memory device requires repeated refreshing.

27. The apparatus according to claim 26, wherein the second memory device does not require refreshing.

28. The apparatus according to claim 27, wherein the third memory device has a write latency that is significantly higher than its read latency.

29. The apparatus according to claim 27, wherein the third memory device requires significantly more power to perform a write operation than a read operation.

30. The apparatus according to claim 18, wherein the third memory device has a write latency that is significantly higher than its read latency.

31. The apparatus according to claim 18, wherein the third memory device requires significantly more power to perform a write operation than a read operation.

32. A method of migrating data between storage devices in a computer system, comprising steps of:
   a. assigning a data block to a first memory device of the computer system;
   b. computing an anticipated amount of time before a next write access to the data block;
   c. removing the data block from the first memory device when the anticipated amount of time until the next write access to the data block exceeds a first threshold;
   d. computing an anticipated amount of time before a next read access to the data block; and
   e. inserting the data block into a second memory device of the computer system when the anticipated time until the next read access to the data block exceeds a second threshold; otherwise, inserting the data block into a third memory device of the computer system.

33. The method according to claim 32, wherein the third memory device has a write latency that is significantly higher than its read latency.

34. The method according to claim 32, wherein the third memory device requires significantly more power to perform a write operation than a read operation.

* * * * *